United States Patent [19]

Berger et al.

[11] Patent Number: 4,682,640

[45] Date of Patent: Jul. 28, 1987

[54] CIRCUMFERENTIAL CONDUIT MEANS FOR INFLATING A CLOSED TORUS TIRE

[75] Inventors: Robert E. Berger, North Canton; Richard L. Crossman; William F. Conley, both of Tallmadge, all of Ohio

[73] Assignee: The Goodyear Tire & Rubber Company, Akron, Ohio

[21] Appl. No.: 390,108

[22] Filed: Jun. 21, 1982

[51] Int. Cl.$^4$ ............................................. B60C 5/00
[52] U.S. Cl. .................................. 152/405; 152/429; 152/453; 301/5 VH
[58] Field of Search ............... 152/427, 428, 429, 430, 152/DIG. 7, DIG. 11, 453, 363, 364, 365, 396, 401, 404, 405, 406; 301/5 VH, 35 SL, 35 R; 156/401, 416; 92/92

[56] References Cited

U.S. PATENT DOCUMENTS

| | | | |
|---|---|---|---|
| 1,750,407 | 3/1930 | Kopp | 152/405 |
| 2,642,316 | 6/1953 | Frandi | 152/404 |
| 2,731,061 | 1/1956 | Clark | 152/341 |
| 2,884,042 | 4/1959 | Seaton | 152/404 |
| 3,877,504 | 4/1975 | Grawey et al. | 152/405 |
| 4,043,370 | 8/1977 | Unwin et al. | 152/354 R |
| 4,057,445 | 11/1977 | Brinkley | 152/354 R |
| 4,087,306 | 5/1978 | Head et al. | 156/401 |
| 4,087,307 | 5/1978 | Head et al. | 156/401 |
| 4,106,543 | 8/1978 | Sano | 152/427 |
| 4,181,169 | 1/1980 | Grawey et al. | 152/404 |
| 4,253,514 | 3/1981 | Imamura | 152/405 |

FOREIGN PATENT DOCUMENTS

| | | | |
|---|---|---|---|
| 636051 | 9/1936 | Fed. Rep. of Germany | 152/429 |
| 1382994 | 11/1964 | France | 152/427 |
| 8200978 | 4/1982 | PCT Int'l. Appl. | 152/429 |

Primary Examiner—Donald E. Czaja
Assistant Examiner—Ramon R. Hoch
Attorney, Agent, or Firm—L. R. Drayer

[57] ABSTRACT

A closed torus tire may be inflated by means of a circumferential conduit located at the interface of the tire and a rim. The closed inflation chamber of the closed torus tire communicates with the circumferential conduit via an air inlet passageway through the annular base region of the tire's carcass. An inflation valve passageway through the rim also communicates with the circumferential conduit to provide an air conduit means for inflating the closed torus tire.

10 Claims, 6 Drawing Figures

CIRCUMFERENTIAL CONDUIT MEANS FOR INFLATING A CLOSED TORUS TIRE

BACKGROUND OF THE INVENTION

The present invention relates to pneumatic tires, and more specifically to closed torus tires that are inflated by means of a circumferential conduit.

Closed torus tires, sometimes referred to by persons working in the tire arts as tube tires, oval tires, or simply torus tires, have been inflated in the past by means of an integral inflation valve assembly that extended through a passage in the rim upon which the tire was mounted. U.S. Pat. No. 4,043,370 issued to Unwin, et al, teaches a seal arrangement for a closed torus tire including an air inlet passage through the base of the tire, and a raised sealing device for forming a seal immediately about the air inlet passage and a valve opening in the rim upon which the tire is mounted. Both of these means for inflating a closed torus tire have the disadvantage that they may be rendered inoperable by circumferential slippage of the closed torus tire with respect to the rim that it is mounted upon. In the case of a tire having an integral valve, the valve stem may be sheared off. In the case of a tire manufactured in accordance with U.S. Pat. No. 4,043,370 the air inlet and sealing device may be displaced such that it no longer communicates with the valve opening in the rim.

The foregoing disadvantages may be overcome by a closed torus tire provided in accordance with one aspect of the present invention, which comprises: a carcass defining a closed inflation chamber, said carcass having an annular base region with a radially inner mounting surface having a circumferential groove therein; and said annular base region having an air inlet passageway therethrough communicating with said circumferential groove to provide an air conduit means for inflating the closed torus tire.

There is provided in accordance with another aspect of the present invention a closed torus tire comprising: a carcass defining a closed inflation chamber, said carcass having an annular base region with a radially inner mounting surface having a circumferential rib extending radially inward therefrom, said circumferential rib having a radially inner circumferential surface; and said annular base region and said rib having an air inlet passageway therethrough communicating with said closed inflation chamber and the radially inner circumferential surface of said rib to provide an air conduit means for inflating the closed torus tire.

There is provided in accordance with yet another aspect of the present invention a closed torus tire comprising: a carcass defining a closed inflation chamber, said carcass having an annular base region with a radially inner mounting surface; an annular insert having radially inner and outer circumferential surfaces, the radially outer circumferential surface of said annular insert being bonded to said radially inner mounting surface, the radially inner circumferential surface of said annular insert having a circumferential groove therein; and said annular base region and said annular insert having an air inlet passageway therethrough communicating with the circumferential groove to provide an air conduit means for inflating the closed torus tire.

There is provided in accordance with yet another aspect of the present invention a rim for mounting a closed torus tire thereon, said rim comprising: (a) an annular rim base having first and second axial ends and radially inner and outer circumferential surfaces, said rim base having a retaining flange located near said first axial end; (b) an annular rim base extension having first and second axial ends and radially inner and outer circumferential surfaces, said rim base extension having a retaining flange located near said second axial end, said rim base and said rim base extension being adjacent to one another and attached to one another by means for attachment; and (c) a circumferential conduit extending about said rim and communicating with an inflation valve passageway through said rim to provide an air conduit means for inflating a closed torus tire.

There is provided in accordance with yet another aspect of the present invention the assembly of a closed torus tire and a rim, said assembly comprising: (a) a rim having an annular rim base with first and second axial ends and radially inner and outer circumferential surfaces, said rim having an inflation valve passageway therethrough, and an inflation valve assembly attached by means for attachment to said inflation valve passageway; (b) a closed torus tire mounted around said rim, said closed torus tire having a carcass defining a closed inflation chamber, said carcass having an annular base region with a radially inner mounting surface, said annular base region having an air inlet passageway therethrough; (c) a circumferential conduit located at an interface of said closed torus tire and said rim and communicating with both the inflation valve passageway of said rim and the air inlet passageway of said closed torus tire to provide an air conduit means for inflating the closed torus tire; and (d) a means for forming a seal between said closed torus tire and said rim to make the assembly airtight.

BRIEF DESCRIPTION OF THE DRAWINGS

To acquaint persons skilled in the tire and rim arts more fully with the present invention, the preferred embodiments are described below with reference to the drawings in which.

DETAILED DESCRIPTION OF THE INVENTION

Figure 1:
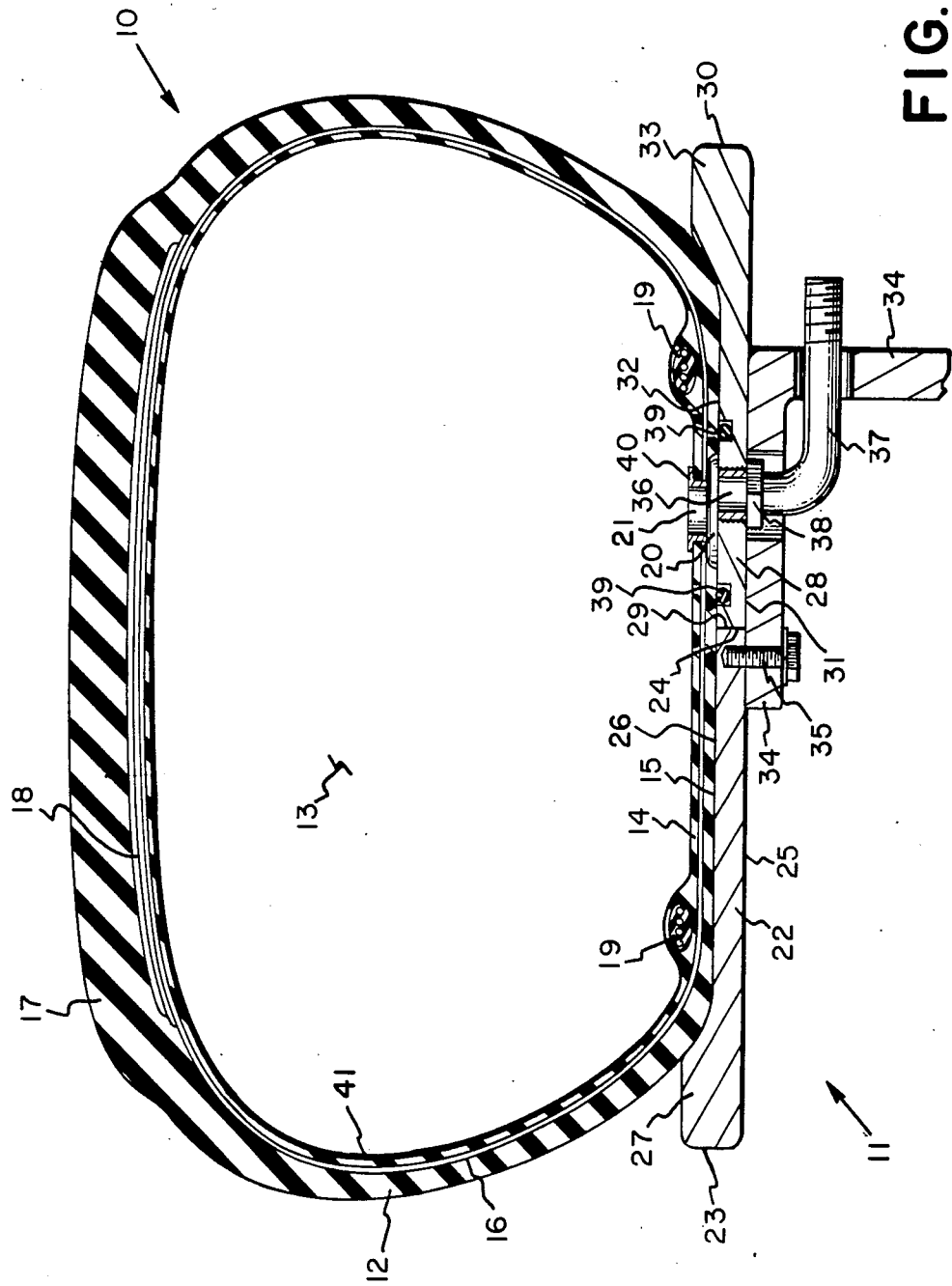
FIG. 1 is a radial cross-sectional view of a closed torus tire manufactured in accordance with one aspect of the present invention and mounted upon a rim.

There is shown in FIG. 1 a radial cross-sectional view of a closed torus tire 10 manufactured in accordance with one aspect of the present invention and mounted upon a rim 11. The closed torus tire 10 comprises a carcass 12 defining a closed inflation chamber 13, and having an annular base region 14 with a radially inner mounting surface 15. As used herein '37 radial" and "radially" indicate a plane which includes the axis of rotation of a tire, rim, or tire and rim assembly; "radially inward" indicates a direction moving in a radial plane towards the axis of rotation of a tire, rim, or tire and rim assembly; and "radially outward" indicate a plane which includes the axis of rotation of a tire, rim, or tire and rim assembly; "radially inward" indicates a direction moving in a radial plane towards the axis of rotation of a tire, rim, or tire and rim assembly; and "radially outward" indicates a direction moving in a radial plane away from the axis of rotation of a tire, rim, or tire and rim assembly. As used herein "axial" and axially" refer to the axis of rotation of a tire, rim, or tire and rim assembly; "axially inward" indicates a direction going from one axial extremity of the tire, rim, or tire and rim assembly towards the mid-circumferential plane of the tire, rim or tire and rim assembly; and "axially outward" indicates a direction going from the mid-circumferential plane of the tire, rim, or tire and rim assembly towards one axial extremity of the tire, rim or tire and rim assembly. As used herein the "mid-circumferential plane" of a tire, rim or tire and rim assembly means a plane that is perpendicular to the axis of rotation of a tire, rim or tire and rim assembly and is located equidistant from the axial extremities of the tire, rim or tire and rim assembly.

The carcass 12 of a closed torus tire 10 is generally comprised of a carcass reinforcing ply 16 comprising a plurality of parallel reinforcing elements. It is preferable that the reinforcing elements of the carcass reinforcing ply be oriented at an angle of between about 75° and about 90° with respect to the mid-circumferential plane of the tire, or in other words that the carcass be what is commonly referred to in the tire art as a radial tire carcass. The carcass may further comprise an air impervious innerliner 41 that substantially surrounds the closed inflation chamber. A closed torus tire may further comprise: a tread portion 17 disposed about the crown region of the carcass, a tread reinforcement structure 18 interposed between the tread portion and the carcass, and a plurality of axially spaced apart roll-restraining hoops 19 adjoining the annular base region 14 of the carcass. These roll-restraining hoops are substantially inextensible rings, preferably metallic, that at least partially restrain a closed torus tire from rolling in an axial direction. The remainder of the closed torus tire is preferably made of elastomeric materials, except for the reinforcing elements of the carcass reinforcing ply and the tread reinforcing plies of the tread reinforcement structure. A closed torus tire manufactured in accordance with any aspect or embodiment of the present invention may generally be manufactured as disclosed in U.S. Pat. No. 4,057,445 issued to Brinkley, or by any other of several known methods of manufacturing closed torus tires. However, instead of installing an integral inflation valve assembly through the annular base region of the carcass of the closed torus tire, the radially inner mounting surface 15 has a circumferential groove 20 therein, and the annular base region 14 has an air inlet passageway 21 extending therethrough and communicating with the circumferential groove to provide an air conduit means for inflating the closed torus tire.

The rim 11 that a closed torus tire 10 manufactured in accordance with this first embodiment of the invention is preferably mounted upon comprises an annular rim base 22 having first and second axial ends 23,24 and radially inner 25 and outer 26 circumferential surfaces; and a retaining flange 27 is located near the first axial end 23 of the rim base to restrict axial movement of the closed torus tire 10 with respect to the rim 11. The rim 11 is further comprised of an annular rim base extension 28, having first and second axial ends 29, 30 and radially inner 31 and outer 32 circumferential surfaces, and having a retaining flange 33 located near the second axial end 30. The rim base and the rim base extension are adjacent to one another, and are attached to one another by means for attachment. For example an adapter or wheel 34 may be attached to the radially inner circumferential surface 31 of the rim base extension 28 by means for attachment, such as welding, and may extend in an axial direction beyond the first axial end 29 of the rim base extension. The second axial end 24 of the rim base 22, and the first axial end 29 of the rim base extension 28 are adjacent to one another, and the rim base is attached to the adapter or wheel 34 by means of attachment 35 such as a plurality of bolts, screws or other devices. Of course, the adapter or wheel 34 could be attached by means for attachment to the rim base, and the rim base and rim base extension fastened together in a manner substantially the same as already described without deviating from the spirit of the invention, or the rim base and rim base extension may be attached to one another with the second axial end of the rim base adjacent to the first axial end of the rim base extension by any other suitable means. In the embodiment shown in FIG. 1 the rim base extension 28 has an inflation valve passageway 36 therethrough, with an inflation valve assembly 37 attached by means for attachment 38, such as threads, rubber grommets, or locking nuts, to the inflation valve passageway. Of course, the inflation valve passageway could be through the rim base if the designer should so desire.

The assembly of a closed torus tire and a rim manufactured in accordance with every embodiment of the present invention disclosed herein must have a circumferential conduit, such as that defined by the circumferential groove 20 in the radially inner mounting surface 15 of the closed torus tire and the outer circumferential surface 32 of the rim base extension located at the interface of the tire and the rim, said circumferential conduit communicating with both an air inlet passageway 21 through the annular base region of the closed torus tire and an inflation valve passageway 36 through the rim 11 to provide an air conduit means for inflating the closed torus tire 10. In other words, the key to the present invention is the axial alignment of an air inlet passageway of a closed torus tire, a circumferential conduit at the interface of the closed torus tire and a rim, and an inflation valve passageway of the rim, so that regardless of the amount of relative circumferential movement between the closed torus tire and rim, the closed inflation chamber of the closed torus tire will at all times be communicating with the inflation valve passageway of the rim. It is believed that this invention presents an improvement over prior art closed torus tires, and closed torus tire and rim assemblies, wherein the closed inflation chamber of the closed torus tire could become isolated from the inflation valve assembly due to either the shearing off of the inflation valve assembly or the displacement of an air inlet passageway surrounded by sealing ridges away from the inflation valve passageway, due to circumferential movement of the closed torus tire relative to the rim.

It is necessary that an assembly of a closed torus tire and a rim manufactured in accordance with this invention further comprise a means for forming a seal 39 located between the closed torus tire and the rim to make the assembly airtight. In the preferred embodiments of a closed torus tire and rim assembly manufactured in accordance with this aspect of the invention the means for forming a seal 39 between the closed torus tire and the rim comprises a plurality of circumferential sealing grooves in the radially outer circumferential surface 32 of the rim base extension 28, one of the sealing grooves being located on each side of the circumferential conduit, with respect to the axis of rotation of the assembly, and a sealing ring in each of the sealing grooves. The uncompressed radial height of the sealing rings should be greater than the radial depth of the sealing grooves. Most preferably the sealing rings have a circular cross section, such as "O" rings of an elastomeric substance. While the means for forming a seal is most preferably a sealing ring that can be replaced if it becomes necessary to demount and then remount the tire, there are other methods of forming a seal between the tire and rim that may be employed at the discretion of a designer or engineer. For example, the closed torus tire may further comprise a plurality of sealing ribs (not shown) extending circumferentially about and radially inward from its radially inner mounting surface, one of the sealing ribs being located on each side of the circumferential groove in the radially inner mounting surface, with respect to the axis of rotation of the tire. The disadvantage to sealing ribs that are integral to a closed torus tire, of course, is that the ribs may become worn down over a period of time due to abrasion with the rim, and the integral ribs may not be repaired as conveniently as the separate sealing rings may be replaced.

The closed torus tire may have one or more air inlet passageways connecting the closed inflation chamber 40 with the circumferential conduit. The air inlet passageway, or passageways, may be formed for example by a metal or elastomeric grommet 40 held in position by a collar and bonded to the annual base portion of the carcass of the tire. It is believed that a closed torus tire with a 42 inch (1.0668 meter) outside diameter and a 14 inch (0.3556 meter) section width should be used in conjunction with a circumferential conduit that is about 1 inch (0.0254 meter) in axial width by about 0.36 inches (0.0091 meter) in radial height. Of course, the air inlet passageway of the tire and inflation valve passageway of the rim would need to have axial widths that are less than that of the circumferential conduit. It is desirable in such a large tire to provide the closed torus tire with more than one air inlet passageway.

Figure 2:
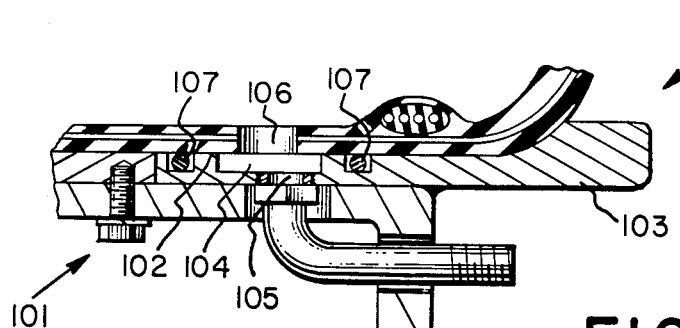
FIG. 2 is a partial radial cross-sectional view of a closed torus tire mounted upon a rim manufactured in accordance with another aspect of the present invention.

Referring now to FIG. 2, there is shown a partial radial cross-sectional view of a closed torus tire 100 mounted upon a rim 101, manufactured in accordance with another aspect of the present invention, to form the assembly of a closed torus tire and a rim. The rim 101 shown in FIG. 2 is substantially the same as the rim shown in FIG. 1, with the exception that the rim has a circumferential conduit extending thereabout and communicating with the inflation valve passageway through the rim. In other words, the outer circumferential surface 102 of the rim base extension 103 has a circumferential groove 104 therein communicating with the inflation valve passageway 105 through the rim base extension. The closed torus tire 100 shown in FIG. 2 is substantially the same as the tire shown in FIG. 1, with the exception that it does not have a circumferential groove in its radially inner mounting surface. Instead the radially inner mounting surface co-operates with the circumferential groove to define the circumferential conduit. However, the closed torus tire 10 shown in FIG. 1 could be mounted upon the rim 101 shown in FIG. 2, as long as the circumferential grooves in the tire and the rim are axially aligned to define a circumferential conduit. The circumferential groove 104 in the outer circumferential surface of the rim base extension, or the combination of the axially aligned circumferential grooves in the radially inner mounting surface of the closed torus tire and the radially outer circumferential surface of the rim base extension, form a circumferential conduit at the interface of a rim and a closed torus tire. The circumferential conduit communicates with both an air inlet passageway 106 of the closed torus tire and an inflation valve passageway 105 of the rim to provide an air conduit means for inflating the closed torus tire. A means for forming a seal 107 between the closed torus tire and rim to make the assembly airtight, comprised for example of sealing grooves and "O" rings as described above, is a necessary component of the assembly. An alternative means for forming a seal between a closed torus tire and a rim (not shown) is to have the rim further comprised of a plurality of circumferential sealing ribs extending radially outward from the outer circumferential surface of the rim base extension, one of the sealing ribs being located on each side of the circumferential conduit, with respect to the axis of rotation of the rim or closed torus tire and rim assembly. Of course, at the discretion of a designer the circumferential groove and associated means for forming a seal could be made a part of the rim base, instead of the rim base extension, without departing from the spirit and scope of the present invention.

Figure 3:
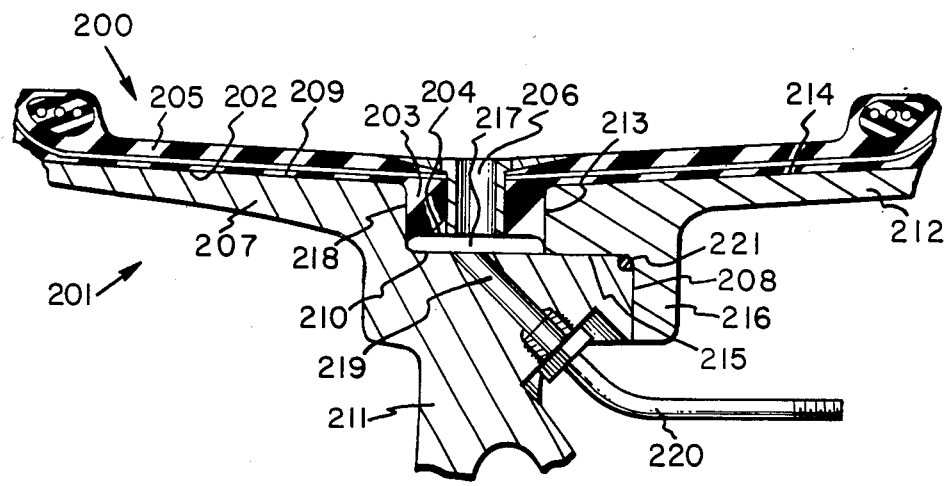
FIG. 3 is a partial radial cross-sectional view of a closed torus tire manufactured in accordance with yet another aspect of the present invention and mounted upon a rim manufactured in accordance with the invention.

Referring now to FIG. 3, there is shown a partial radial cross-sectional view of a closed torus tire 200 manufactured in accordance with another aspect of the present invention mounted upon a rim 201 to form an assembly of a closed torus tire and a rim. A closed torus tire manufactured in accordance with this embodiment of the invention is substantially the same as the closed torus tire shown in FIG. 1 and described herein, except that instead of having a circumferential groove therein the radially inner mounting surface 202 has a circumferential rib 203 extending radially inward therefrom. The circumferential rib 203 has a radially inner circumferential surface 204 that is preferably concave when viewed from the axis of rotation of the closed torus tire. The closed torus tire's annular base region 205 and the circumferential rib have an air inlet passageway 206 therethrough such that the closed inflation chamber of the closed torus tire communicates with the radially inner circumferential surface of the circumferential rib to provide an air conduit means for inflating the closed torus tire. The rim 201 shown in FIG. 3 comprises a rim base 207 having first (not shown) and second 208 axial ends, a radially outer circumferential surface 209, and a circumferential slide mounting, or register, surface 210. The radially outer circumferential surface of the rim base has a diameter that is greater than that of the circumferential slide mounting surface of the rim base. The radially outer circumferential surface of the rim base extends axially inwards from the first axial end of the rim base, and the circumferential slide mounting surface extends axially inwards from the second axial end of the rim base. A wheel on flange 211 extends radially inward from the rim base near the second axial end thereof. A rim for mounting a closed torus tire thereon, according to this aspect of the invention, is further comprised of a rim base extension 212 having first 213 and second (not shown) axial ends, a radially outer circumferential surface 214, a radially inner circumferential surface 215, and a flange 216 extending radially inward near the first axial end thereof. The radially inner circumferential surface of the rim base extension has a diameter, from the first axial end to the flange, that is complementary to the diameter of the circumferential slide mounting surface of the rim base, and is slideably mounted thereon such that the flange of the rim base extension is adjacent to the second axial end of the rim base and is attached thereto by means for attachment (not shown), such as bolts, a snap ring, or other suitable devices. The circumferential conduit is a circumferential groove 217 in the rim defined by: a radially extending surface 218 connecting the radially outer circumferential and circumferential slide mounting surfaces of the rim base, the first axial end 213 of the rim base extension, and the circumferential slide mounting surface 210 of the rim base. An inflation valve passageway 219 through the rim base communicates with the circumferential groove, and has an inflation valve assembly 220 attached thereto by means for attachment. A means for forming a seal 221, such as an "O" ring or gasket, is engaged between the rim base and rim base extension to form an airtight seal.

The circumferential rib of the closed torus tire shown in FIG. 3 serves as a means for forming a seal between the closed torus tire and rim to make the assembly of the closed torus tire 200 and rim 201 air tight. The circumferential rib has an axlal width that is complementary to the axial width of the circumferential groove of the rim, and a radial height that is less than the radial depth of the circumferential groove of the rim. Therefore, when the circumferential rib of the closed torus tire is engaged with the circumferential groove of the rim the radially inner circumferential surface of the circumferential rib is spaced away from the bottom of the circumferential groove (the circumferential slide mounting surface of the rim base) to define a circumferential conduit located at the interface of the closed torus tire and the rim. As in other embodiments of this invention, the assembly of a closed torus tire and a rim has an air inlet passageway of the tire and an inflation valve passageway of the rim communicating with a circumferential conduit to form an air conduit means for inflating the closed torus tire.

It should be noted that the circumferential rib 203 also acts to restrict the axial movement of a closed torus tire 200 in an assembly of a closed torus tire and rim manufactured in accordance with the embodiment illustrated in FIG. 3 and described above. It is believed that a rim used in this particular embodiment does not need to have restraining flanges located near the first lateral edge of the rim base and second lateral edge of the rim.

Figure 4:
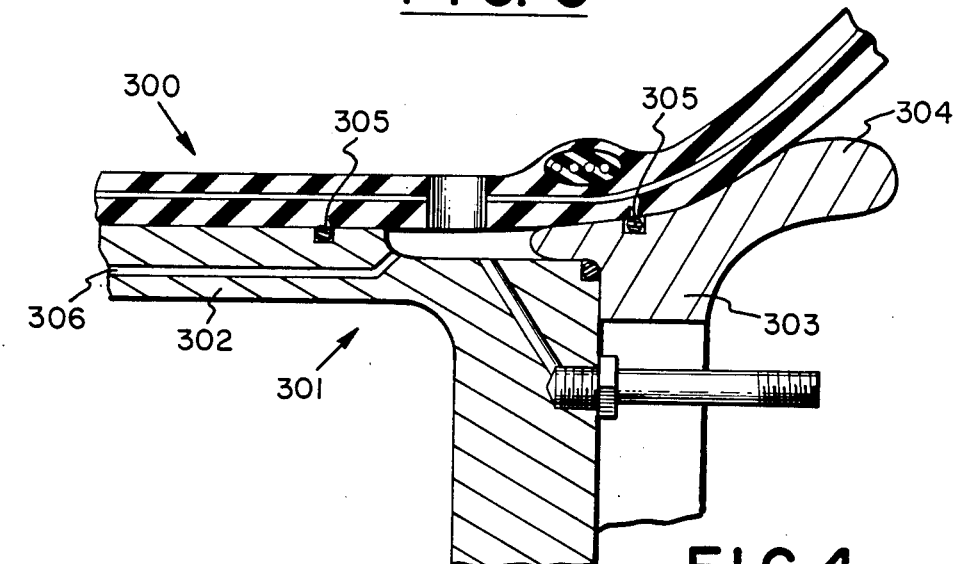
FIG. 4 is a partial radial cross-sectional view of yet another rim manufactured in accordance with the present invention with a closed torus tire mounted thereon.

Referring now to FIG. 4, there is shown a partial radial cross-sectional view of a closed torus tire 300 mounted on a rim 301 manufactured in accordance with another aspect of the present invention. The closed torus tire illustrated in FIG. 4 is substantially the same as the closed torus tire 100 illustrated in FIG. 2 and described above. The rim 301 illustrated in FIG. 4 is very similar to the rim 201 illustrated in FIG. 3 and described above, with a few modifications to facilitate the mounting thereon of a closed torus tire 300 that does not have a circumferential, radial rib extending from its radially inner mounting surface. In other words, a rim manufactured in accordance with this embodiment of the invention comprises a rim base 302 and a rim base extension 303 that are similar to those described in respect to FIG. 3 and further comprises: a retaining flange (not shown) located near the first axial end of the rim base and a retaining flange 304 located near the second axial end of the rim base extension; and, a means for forming a seal 305 between the rim and a closed torus tire mounted upon the rim to make the assembly airtight. The retaining flanges are needed to restrict the axial movement of a closed torus tire in the assembly of a closed torus tire and rim manufactured in accordance with this embodiment of the invention. The means for forming a seal is needed to make the assembly airtight, and is substantially the same as that described above in respect to the assemblies shown in FIGS. 1 and 2 except that one sealing groove and sealing ring is located in each the rim base and the rim base extension.

The rim 301 shown in FIG. 4 may be used to illustrate other features that a designer may wish to employee with rims, or the assembly of a closed torus tire and a rim, manufactured in accordance with any of the embodiments described herein. In certain applications, such as aircraft rims, it may be desireable to have one or more fuse plug passageways 306 extending through the rim base, or the rim base extension, from the circumferential conduit to a fuse plug located at a surface of the rim base or rim base extension. A fuse plug is a eutectic alloy that melts at a predetermined temperature to allow air to escape from the tire, which may be weakened if it gets too hot. A rupture diaphragm passageway (not shown) may also connect the circumferential conduit with a surface of the rim base or rim base extension. A rupture diaphragm is a device to release inflation pressure from the tire when the inflation pressure exceeds a predetermined level.

Figure 5:
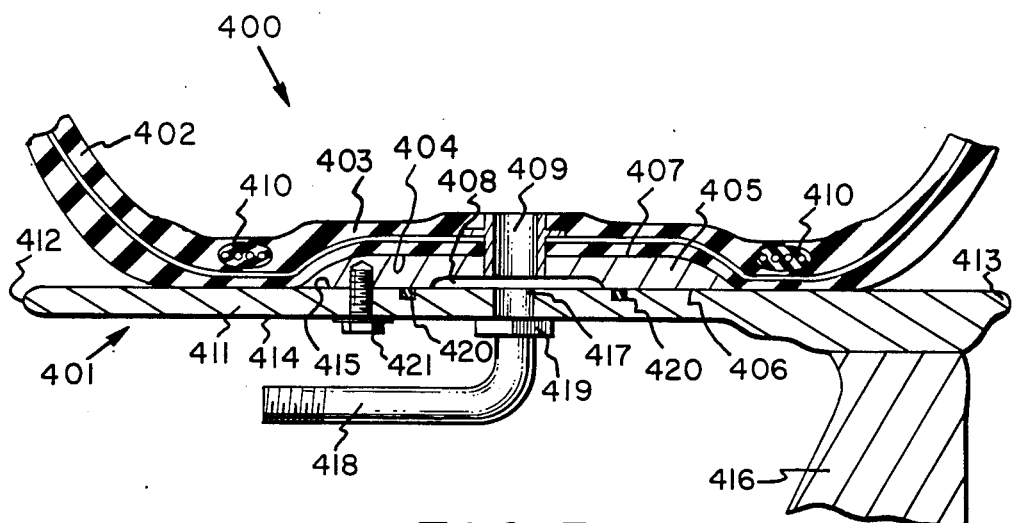
FIG. 5 is a partial radial cross-sectional view of a closed torus tire manufactured in accordance with yet another aspect of the present invention mounted on a rim.

Referring next to FIG. 5 there is shown a partial radial cross-sectional view of a closed torus tire 400 manufactured in accordance with yet another aspect of the present invention and mounted on a rim 401. The closed torus tire illustrated in FIG. 5 is similar to the other closed torus tires described herein and comprises a carcass 402 defining a closed inflation chamber. The carcass has an annular base region 403 with a radially inner mounting surface 404. An annular insert 405, of aluminum, fiberglass or any other suitable material, having radially inner 406 and outer 407 circumferential surfaces, has its radially outer circumferential surface 407 bonded to the radially inner mounting surface 404 of the tire carcass. The radially inner circumferential surface 406 of the annular insert has a circumferential groove 408 therein, and the annular base region of the tire carcass and the annular insert have an air inlet passageway 409 therethrough. Put another way, the annular insert has an air inlet passageway therethrough that communicates with an air inlet passage through the annular base region of the tire carcass and the circumferential groove of the annular insert. The closed inflation chamber of the closed torus tire communicates with the circumferential groove of the annular insert via the air inlet passageway to act as an air conduit for inflating the closed torus tire. As pointed out above, the closed torus tire may further comprise a plurality of roll-restraining hoops 410 adjoining the annular base region of the carcass and spaced apart with respect to the axis of rotation of the closed torus tire. A closed torus tire manufactured in accordance with this embodiment of the invention may have the annular insert 405 located between the roll-restraining hoops, with respect to the axis of rotation of the closed torus tire.

A closed torus tire 400 manufactured in accordance with the embodiment shown in FIG. 5 may be mounted upon a single piece rim 401 or a multiple piece rim. The single piece rim shown in FIG. 5 comprises a rim base 411 having first 412 and second 413 axial ends, and radially inner 414 and outer 415 circumferential surfaces. At the discretion of a designer a wheel means 416 may be an integral part of the rim. The rim base has an inflation valve passageway 417 therethrough, with an inflation valve assembly 418 attached thereto by means for attachment 419, such as a locking nut or rubber grommet. The assembly of a closed torus tire and rim manufactured in accordance with this embodiment is further comprised of a means for forming a seal 420 between the closed torus tire and the rim to make the assembly airtight. The means for forming a seal between the closed torus tire and the rim is preferably the groove and sealing ring type described above, with at least one groove/sealing ring combination located on each side of the circumferential groove of the annular insert, with respect to the axis of rotation of the assembly. As in the other embodiments, the air inlet passageway 409 of the tire, circumferential conduit at the interface of the closed torus tire and rim (defined by circumferential groove 408 in the annular insert and the radially outer circumferential surface 415 of the rim), and inflation valve passageway 416 of the rim act as an air conduit means for inflating the closed torus tire. An assembly of a closed torus tire and a rim manufactured in accordance with this aspect of the invention further comprises a means for attachment 421, preferably a threaded fastener such as a screw or bolt, for attaching the rim to the annular insert of the tire. This means for attachment serves to restrict the axial movement of the closed torus tire with respect to the rim, and it is believed that a rim used in manufacturing an assembly according to this embodiment need not have flanges located near the axial ends thereof. While the means for attachment 421 may also serve to restrict the circumferential movement of the closed torus tire relative to the rim, a failure or breaking of the means for attachment would have the air conduit means for inflating the tire as a back-up system to prevent problems caused by circumferential movement of a closed torus tire with respect to a rim as discussed herein.

Figure 6:
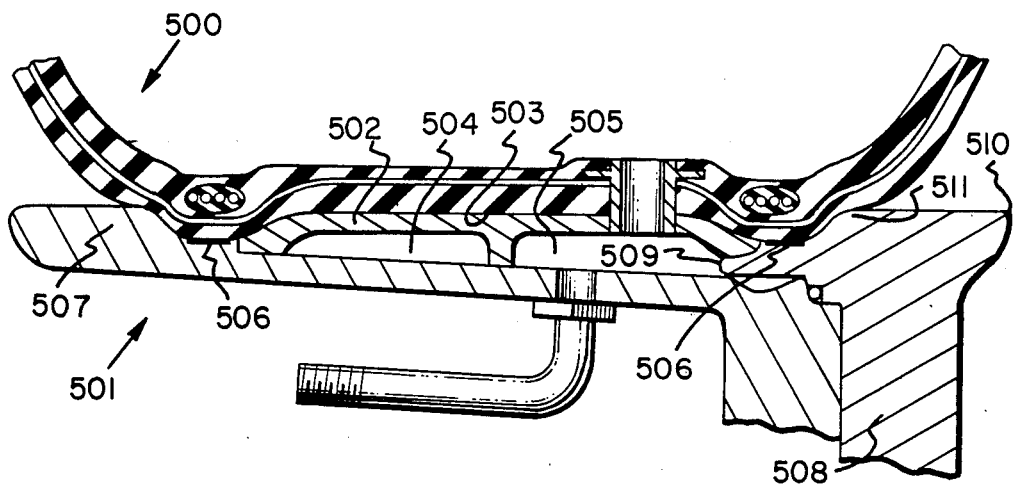
FIG. 6 is a partial radial cross-sectional view of a closed torus tire similar to that illustrated in FIG. 5, but mounted on a different rim.

Referring now to FIG. 6, there is shown a partial radial cross-sectional view of a closed torus tire 500 similar to that illustrated in FIG. 5, but mounted on a two piece rim 501 that is similar to the rims 11 & 301 shown in FIGS. 1 and 2 and described herein. The annular insert 502 bonded to the radially inner mounting surface 503 of the carcass of the tire has two circumferential grooves 504 and 505 in its radially inner surface. The second groove helps to reduce the weight of the closed torus tire. The assembly of a closed torus tire and a rim shown in FIG. 6 illustrates another means for forming a seal between the tire and the rim which comprises a plurality of sealing strips 506, one strip being located on each side of the air conduit means for inflating the closed torus tire. The sealing strips are adhesive on both their radially inner and outer surfaces and may be employed with any of the embodiments of the present invention described herein. The assembly is substantially the same as that described in respect to FIG. 5 except that the rim base has a retaining flange 507 near its first axial end and the rim further comprises a rim base extension 508 having first and second 509, 510 axial ends and radially inner and outer circumferential surfaces; the rim base extension has a retaining flange 511 near its second axial end, and the rim and rim base extension are adjacent to one another and attached by means for attachment (not shown) such as bolts or snap rings.

While certain representative details and embodiments have been shown for purposes of illustrating the invention, it will be apparent to those skilled in the art that various changes and modifications may be made therein without departing from the spirit or scope of the invention.

What is claimed is:

1. A closed torus tire comprising: a carcass defining a closed inflation chamber, said carcass having an annular base region with a radially inner mounting surface having a rib extending radially inwardly therefrom and circumferentially thereabout, a plurality of axially spaced apart roll-restraining hoops adjoining said annular base region, said rib having a radially inner circumferential surface; said annular base region and said rib having an air inlet passageway therethrough communicating with said closed inflation chamber and the radially inner circumferential surface of said rib.

2. A closed torus tire according to claim 1 wherein the radially inner circumferential surface of said rib is concave as viewed from the axis of rotation of the closed torus tire.

3. The assembly of a closed torus tire and a rim, said assembly comprising:
   (a) a multi-piece rim having a pair of annular rim base members with radially outer circumferential surfaces and axially abutting mating surfaces, said annular rim base members cooperating to define an annular groove that separates the outer circumferential surfaces of the rim base members, an inflation valve passageway extending through a first one of said annular rim base members and communicating with a surface of said first annular rim base member which defines a base of said groove, the mating surfaces of said annular rim base members having an airtight seal between them; and
   (b) a closed torus tire comprising a carcass defining a closed inflation chamber, said carcass having an annular base region with a rib extending radially inwardly therefrom and circumferentially thereabout, a plurality of axially spaced apart roll-restraining hoops adjoining said annular base region, the closed torus tire being mounted upon the rim with the annular base region of the tire being adjacent to the radially outer circumferential surfaces of the rim base members and said rib being disposed within the groove defined by said rim base members, said rib having an axial width that is complementary to the axial width of said groove to restrict the axial movement of the closed torus tire with respect to the rim and to form an airtight seal between said rib and said rim base members, said rib having a radially inner circumferential surface that is spaced apart from the base of said groove in a radial direction, and the annular base region and rib of said tire having an air inlet passageway therethrough communicating with said closed inflation chamber and the radially inner circumferential surface of the rib.

4. The assembly of a closed torus tire and a rim as described in claim 3 wherein both of said annular rim base members comprise first and second axial ends and radially inner and outer circumferential surfaces, a first of said annular rim base members further comprising a circumferential slide mounting surface with a diameter that is less than that of the radial outer circumferential surface of said first annular rim base member, said radially outer circumferential surface extending axially inwardly from the first axial end of the first annular rim base member and the circumferential slide mounting surface extending axially inwardly from the second axial end of the first rim base member, a radially extending surface communicating with both the radially outer circumferential surface and circumferential slide mounting surface of the first rim base mbmer; and a second of said annular rim base members further comprising a flange extending radially inwardly from the radially inner circumferential surface of said second annular rim base member, said flange being axially spaced apart from the first axial end of said second annular rim base member, the radially inner circumferential surface of said second annular rim base member having a diameter between the first axial end of the second annular rim base member and the flange that is complementary to the diameter of the circumferential slide mounting surface of the first annular rim base member, said second annular rim base member being slideably mounted on said first annular rim base member such that the flange of the second annular rim base member is adjacent to the second axial end of the first annular rim base member, the first axial end of the second annular rim base member extending radially outwardly from the circumferential slide mounting surface of the first annular rim base member and axially spaced apart from the radially extending surface that communicates with both the radially outer circumferential surface and circumferential slide mounting surface of the first annular rim base member, said annular rim base members being attached to one another by means for attachment; said groove being defined by (i) the radially extending surface that communicates with both the radially outer circumferential surface and circumferential slide mounting surface of the first annular rim base member;

(ii) the first axial end of the second annular rim base member; and (iii) a portion of the circumferential slide mounting surface of the first annular rim base member; the inflation valve passageway that is extending through the first annular rim base member communicating with said portion of the annular circumferential slide mounting surface which defines the base of said groove.

5. The assembly of a closed torus tire and a rim according to claim 3 further comprising an inflation valve assembly attached by means for attachment to a wall of said inflation valve passageway through said first annular rim base member.

6. The assembly of a closed torus tire and a rim according to claim 4 further comprising an inflation valve assembly attached by means for attachment to a wall of said inflation valve passageway through said first annular rim base member.

7. The assembly of a closed torus tire and a rim according to claim 3 wherein the radialy inner circumferential surface of the rib of said closed torus tire is concave as viewed from the axis of rotation of said assembly.

8. The assembly of a closed torus tire and a rim according to claim 4 wherein the radialy inner circumferential surface of the rib of said closed torus tire is concave as viewed from the axis of rotation of said assembly.

9. The assembly of a closed torus tire and a rim according to claim 5 wherein the radialy inner circumferential surface of the rib of said closed torus tire is concave as viewed from the axis of rotation of said assembly.

10. The assembly of a closed torus tire and a rim according to claim 6 wherein the radialy inner circumferential surface of the rib of said closed torus tire is concave as viewed from the axis of rotation of said assembly.

* * * * *